United States Patent
Inoue et al.

(10) Patent No.: US 6,755,766 B2
(45) Date of Patent: Jun. 29, 2004

(54) VEHICLE POWER TRANSMISSION DEVICE

(75) Inventors: Eiji Inoue, Fujisawa (JP); Takumi Shinojima, Fujisawa (JP); Satoshi Kishi, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 14 days.

(21) Appl. No.: 10/309,645

(22) Filed: Dec. 4, 2002

(65) Prior Publication Data

US 2003/0114271 A1 Jun. 19, 2003

(30) Foreign Application Priority Data

Dec. 13, 2001 (JP) ........................................ 2001-380272

(51) Int. Cl.⁷ .......................... B60K 41/02; B60K 41/22
(52) U.S. Cl. .......................... 477/71; 477/175; 192/3.58
(58) Field of Search ............................ 477/79, 80, 174, 477/175, 180; 192/3.25, 3.26, 3.58

(56) References Cited

U.S. PATENT DOCUMENTS

| | | | | |
|---|---|---|---|---|
| 4,388,987 A | | 6/1983 | Hennessey et al. | 192/3.26 |
| 4,548,303 A | * | 10/1985 | Beemer et al. | 192/3.58 |
| 4,582,182 A | * | 4/1986 | Takeda et al. | 477/63 |
| 4,836,057 A | | 6/1989 | Asayama et al. | 74/867 |
| 5,082,097 A | | 1/1992 | Goeckner et al. | 192/32 |
| 5,601,172 A | | 2/1997 | Kale et al. | 192/85 |
| 5,649,880 A | * | 7/1997 | Tsutsui et al. | 477/125 |
| 5,754,969 A | * | 5/1998 | Ando et al. | 477/174 |
| 6,199,450 B1 | * | 3/2001 | Carlson et al. | 74/733.1 |
| 6,390,950 B2 | * | 5/2002 | Noda et al. | 477/180 |
| 6,554,737 B1 | * | 4/2003 | Vorndran et al. | 477/176 |

FOREIGN PATENT DOCUMENTS

EP          1 243 806 A2      9/2002

OTHER PUBLICATIONS

Copy of European Search Report for Ser. No. EP 02 02 6884 dated Mar. 17, 2003.

* cited by examiner

*Primary Examiner*—Roger Pang
(74) *Attorney, Agent, or Firm*—McCormick, Paulding & Huber LLP

(57) ABSTRACT

It is an object of the present invention to achieve stabilization of clutch transmission torque at the point of half clutch completion during a garage shift upon vehicle start up, and to thereby achieve smooth clutch engagement. In a vehicle power transmission device in which a fluid coupling and a wet friction clutch are provided in series at points on a power transmission path which extends from an engine to a transmission, and which performs engagement/disengagement control of the clutch by varying the pressure of operating fluid used for engagement/disengagement driving the clutch in accordance with duty pulse signals outputted from an electronic control unit, clutch engagement control is begun at the same time as (t1) the transmission is put into gear in a state of clutch disengagement when a vehicle is about to start up from a standstill. When the difference in rotation between the input and output sides of the fluid coupling reaches or exceeds a predetermined value (t3) during this clutch engagement control, a duty Dc corresponding to full clutch engagement is outputted from the electronic control unit.

4 Claims, 5 Drawing Sheets

VEHICLE POWER TRANSMISSION DEVICE

CROSS REFERENCES TO RELATED APPLICATIONS

This application is entitled to the benefit of and incorporates by reference essential subject matter disclosed in Japanese Patent Application No.2001-380272 filed Dec. 13, 2001.

BACKGROUND OF THE INVENTION

1. Field of the Invention

The present invention relates to a vehicle power transmission device, and more particularly to a vehicle power transmission device in which a fluid coupling and a wet friction clutch capable of engagement/disengagement control are provided in series.

2. Description of the Related Art

As is illustrated in FIG. 1, the present inventors have developed a new vehicle power transmission device in which a fluid coupling 2 and a wet friction clutch 3 are provided in series at points along a power transmission path which extends from an engine E to a transmission T/M, and in which the wet friction clutch 3 automatically engages and disengages during transmission. In this case, following an operation to put a vehicle in gear when the vehicle is stationary, the clutch is automatically engaged, thereby generating creep. A typical AT automobile is similar in this respect.

If the clutch engages too quickly, clutch engagement shock (so-called garage shock or the like) is produced, and if the clutch engages too slowly, creep generation takes time following the operation to put the vehicle into gear such that the driver does not know when best to step on the accelerator (large time lag). Thus, in order to strike a balance between reducing the engagement time and the occurrence of clutch engagement shock, control is performed such that the clutch is rapidly engaged in the clutch bite region prior to the beginning of clutch connection, and once the clutch begins to connect the engagement speed is switched to low speed and the clutch is slowly connected (slowly engaged).

More specifically, the operating fluid pressure for driving the engagement/disengagement of the clutch is varied in accordance with duty pulses outputted from an electronic control unit (to be referred to as ECU hereinafter), and the clutch is engagement/disengagement controlled thereby. Further, since this control is open control, the ECU outputs duty pulses in accordance with a predetermined program.

As is illustrated by the broken line in FIG. 5, conventional clutch engagement control is performed by first outputting a predetermined starting duty Dst' from the ECU such that the clutch is engaged to a large extent up to a position near the beginning of clutch connection (this being known as "one-shot engagement control"), then by outputting predetermined slow engagement duties Dk' from the ECU at predetermined time intervals such that the clutch becomes slowly engaged, and finally, when a predetermined final slow engagement duty Ded' has been reached, by outputting a full engagement duty Dc' (=0%) from the ECU such that the clutch becomes fully engaged.

The position at which clutch connection begins, or in other words the torque transmission starting point at which predetermined torque can first be transmitted, will be referred to as the torque point. This torque point is learned by the ECU and used as a reference value for engagement speed switching. The torque point is set as a learning value because of irregularities and individual differences among clutches caused by construction errors, and because the torque point differs from clutch to clutch or from vehicle to vehicle.

In FIG. 5, the torque point is Dlt, and the starting duty Dst' is typically a value which is slightly further toward the disengagement side than the torque point Dlt. As a general principle, provision is made such that excessive engagement shock is not generated by the one-shot engagement control.

Attention will now be focussed upon a garage shift performed during vehicle start-up. Clutch engagement control similar to that described above is also performed here. FIG. 6 shows the state of creep variation during an operation to put the vehicle in gear directly preceding start-up (when a so-called garage shift is being performed), and also illustrates the state of rotation speed variation of the input side (pump) and output side (turbine) of the fluid coupling. The rotation speed of the input side of the fluid coupling is switched to the engine rotation speed Ne (unbroken line). The rotation speed of the output side of the fluid coupling is switched to the turbine rotation speed Nt (dot/dash line) and may be switched as is to the rotation speed of the clutch input side.

Any time earlier than time t0 indicates a braking operation, neutral gear, and clutch disengagement. At time t0, the gear is fully engaged from the aforementioned state to the start-up level, and clutch engagement control begins. Since the output side of the clutch is damped by a brake from the drive wheel side, slippage of the fluid coupling increases as clutch engagement proceeds, and the pump, which is the input side of the fluid coupling, rotates at a constant idling rotation speed which is equal to the engine rotation speed Ne, whereas the turbine rotation speed Nt gradually drops. By this process, creep gradually increases.

Now focussing on control at the point of half clutch completion, this is conventionally performed using a method in which the full engagement duty Dc' (=0%) is outputted during the output of the slow engagement duties Dk' when the predetermined final slow engagement duty Ded' has been reached, whereupon slow engagement control is switched to full engagement control. In other words, if the outputted duties reach the final slow engagement duty Ded' at the point of half clutch completion, then the clutch is fully engaged.

When this method is used in reality, however, the clutch transmission torque at the point of half clutch completion may be unstable due to fluid pressure fluctuation or micro fluctuations in the wet friction clutch during control, and consequently the clutch cannot be engaged smoothly. The cause of this may be the moment at the point of half clutch completion when the clutch plates move from kinetic friction to static friction and the relative rotation difference therebetween is small. As a result of this moment, stability cannot be achieved on a micro level, and there is little redundancy with respect to fluctuation.

Problems arise in particular when the half clutch state (or the amount of time of slow engagement control) is protracted: hunting is produced in the turbine rotation due to temperature rises or the like in the clutch; irregular vehicle behavior (such as shock) is produced; and rattling sounds are produced due to collisions among the gears in the transmission.

SUMMARY OF THE INVENTION

The present invention has been devised in consideration of these problems, and it is an object thereof to create stability in the clutch transmission torque at the point of half clutch completion during a garage shift upon vehicle start-up, and thereby to engage the clutch smoothly.

The present invention is a vehicle power transmission device in which a fluid coupling and a wet friction clutch are provided in series at points on a power transmission path which extends from an engine to a transmission, and which performs engagement/disengagement control of the clutch by varying the operating fluid pressure used for engagement/disengagement driving the clutch in accordance with duty pulse signals outputted from an electronic control unit, wherein, when a vehicle starts up from a standstill, clutch engagement control is begun at the same time as the transmission is put into gear during a braking operation and a state of clutch disengagement, and a duty pulse signal corresponding to full clutch engagement is outputted from the electronic control unit when the rotation difference on the input and output sides of the fluid coupling reaches or exceeds a predetermined value during engagement control.

In this case it is preferable that this clutch engagement control be such that initially, one-shot engagement control, in which a predetermined starting duty pulse signal is outputted from the electronic control unit, is executed such that the clutch is largely engaged up to the vicinity of the torque point and excessive clutch engagement shock is never produced by taking into consideration irregularities in the torque point, whereupon the process moves to slow engagement control. It is also preferable that this slow engagement control be such that first slow engagement duty pulse signals are outputted from the electronic control unit at predetermined time intervals such that the clutch is engaged more slowly than in the one-shot engagement control, and then second slow engagement duty pulse signals are outputted from the electronic control unit at predetermined time intervals once predetermined conditions have been fulfilled such that the clutch is engaged more slowly than in the first slow engagement.

The present invention is also a clutch control method for performing engagement/disengagement control of a clutch in accordance with duty pulse signals outputted from an electronic control unit, which is used in a vehicle power transmission device in which a fluid coupling and a wet friction clutch are provided in series at points on a power transmission path which extends from an engine to a transmission, wherein, when a vehicle starts up from a standstill, clutch engagement control is begun at the same time as the transmission is put into gear during a braking operation and a state of clutch disengagement, and a duty pulse signal corresponding to full clutch engagement is outputted from the electronic control unit when the rotation difference on the input and output sides of the fluid coupling reaches or exceeds a predetermined value during this engagement control.

The present invention is also a power transmission device in which a fluid coupling and a friction-type clutch capable of performing engagement/disengagement control are provided in series at points on a power transmission path, wherein clutch engagement control is executed when the output side of the clutch has been damped, and full clutch engagement control is proceeded to during the process of clutch engagement control when the rotation difference between the input and output sides of the fluid coupling reaches or exceeds a predetermined value.

DESCRIPTION OF THE PREFERRED EMBODIMENTS

A preferred embodiment of the present invention will be described below on the basis of the attached drawings.

Figure 1:
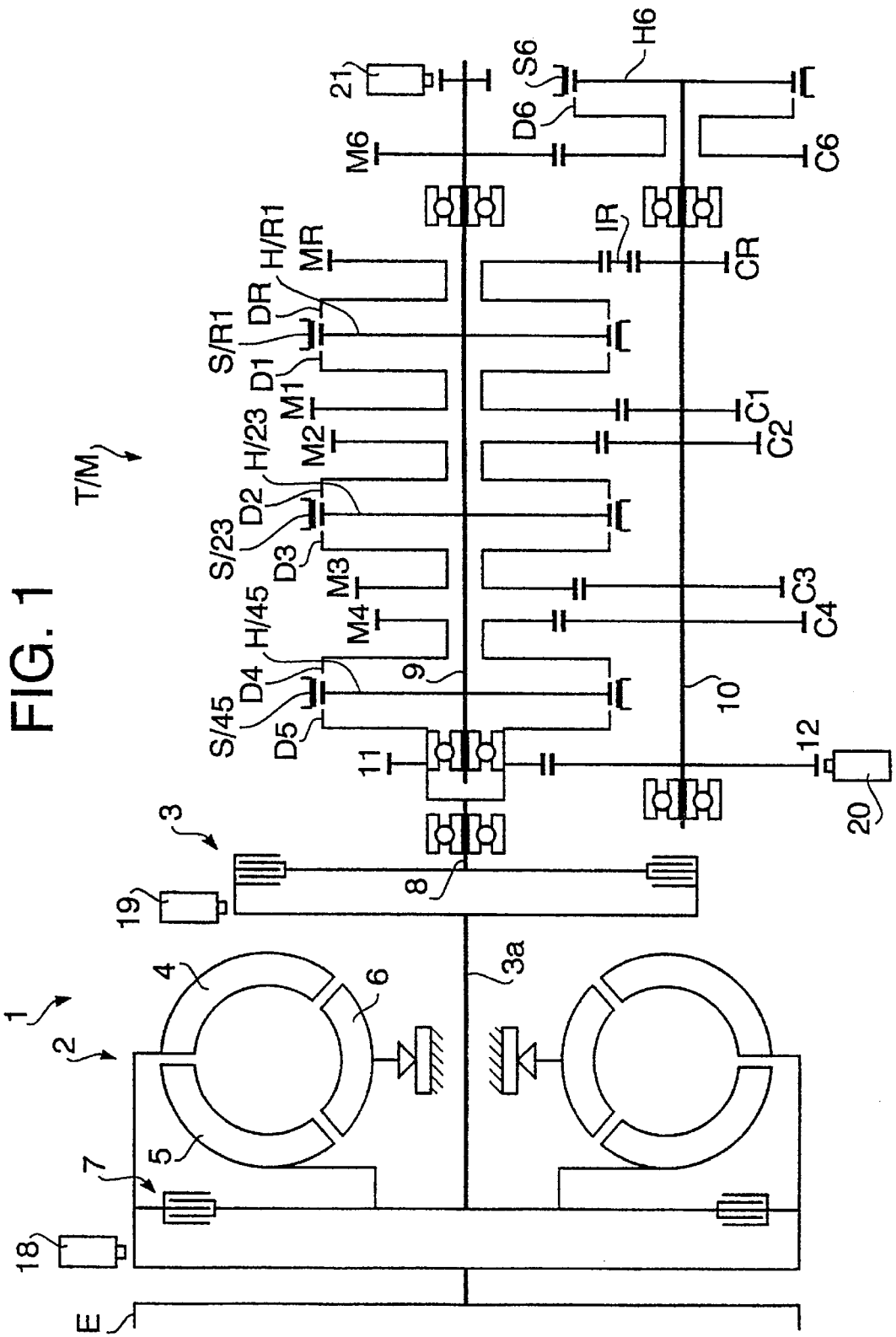
FIG. 1 is a schematic view illustrating a vehicle power transmission device according to an embodiment of the present invention.

FIG. 1 shows a vehicle power transmission device of this embodiment. As is illustrated in the drawing, a transmission T/M is connected to an engine E via a clutch mechanism 1. The clutch mechanism 1 comprises a fluid coupling 2 and a wet-type multiple disc clutch 3. The fluid coupling 2 is provided at a point on the upstream side of a power transmission path which extends from the engine E to the transmission T/M, and the wet-type multiple disc clutch 3 is provided in series with the fluid coupling 2 on the downstream side of the path. Note that "fluid coupling" here indicates a broad concept including a torque converter, and in fact a torque converter is used in this embodiment.

The fluid coupling 2 comprises a pump 4 which is connected to the output shaft (crankshaft) of the engine, a turbine 5 which is connected to the input side of the clutch 3 and faces the pump 4, a stator 6 which is disposed between the pump 4 and the turbine 5, and a lock-up clutch 7 which joins and separates the pump 4 and turbine 5. The input side of the wet-type multiple disc clutch 3 is connected to the turbine 5 via an input shaft 3a, the output side thereof is connected to an input shaft 8 of the transmission T/M, and thus the wet-type multiple disc clutch 3 is engaged and disengaged between the fluid coupling 2 and the transmission T/M.

The transmission T/M comprises an input shaft 8, an output shaft 9 disposed on the same shaft as the input shaft 8, and a countershaft 10 disposed parallel thereto. An input main gear 11 is provided on the input shaft 8. A first speed main gear M1, a second speed main gear M2, a third speed main gear M3, a fourth speed main gear M4, and a reverse main gear MR are respectively axially supported on the output shaft 9, and a sixth speed main gear M6 is fixed thereto. An input counter gear 12 which is meshed with the input main gear 11, a first speed counter gear C1 which is meshed with the first speed main gear M1, a second speed counter gear C2 which is meshed with the second speed main gear M2, a third speed counter gear C3 which is meshed with the third speed main gear M3, a fourth speed counter gear C4 which is meshed with the fourth speed main gear M4, and a reverse counter gear CR which is meshed with the reverse main gear MR via an idling gear IR are fixed onto the countershaft 10, and a sixth speed counter gear C6 which is meshed with the sixth speed main gear M6 is axially supported thereon.

In this transmission T/M, when a sleeve S/R1 which is spline meshed with a hub H/R1 fixed to the output shaft 9 is spline meshed with a dog DR of the reverse main gear MR, the output shaft 9 rotates in reverse, and when this sleeve S/R1 is spline meshed with a dog D1 of the first speed main gear M1, the output shaft 9 rotates in first speed. When a sleeve S/23 which is spline meshed with a hub H/23 fixed to the output shaft 9 is spline meshed with a dog D2 of the second speed main gear M2, the output shaft 9 rotates at second speed, and when this sleeve S/23 is spline meshed with a dog D3 of the third speed gear M3, the output shaft 9 rotates at third speed.

When a sleeve S/45 which is spline meshed with a hub H/45 fixed to the output shaft 9 is spline meshed with a dog D4 of the fourth speed main gear M4, the output shaft 9 rotates at fourth speed, and when this sleeve S/45 is spline meshed with a dog D5 of the input main gear 11, the output shaft 9 rotates at fifth speed (direct drive). When a sleeve S6 which is spline meshed with a hub H6 fixed to the countershaft 10 is spline meshed with a dog D6 of the sixth speed counter gear C6, the output shaft 9 rotates at sixth speed. All of the aforementioned sleeves are manually operated by a shift lever in the driving cab via a shift fork and shift rod (not shown).

Figure 2:
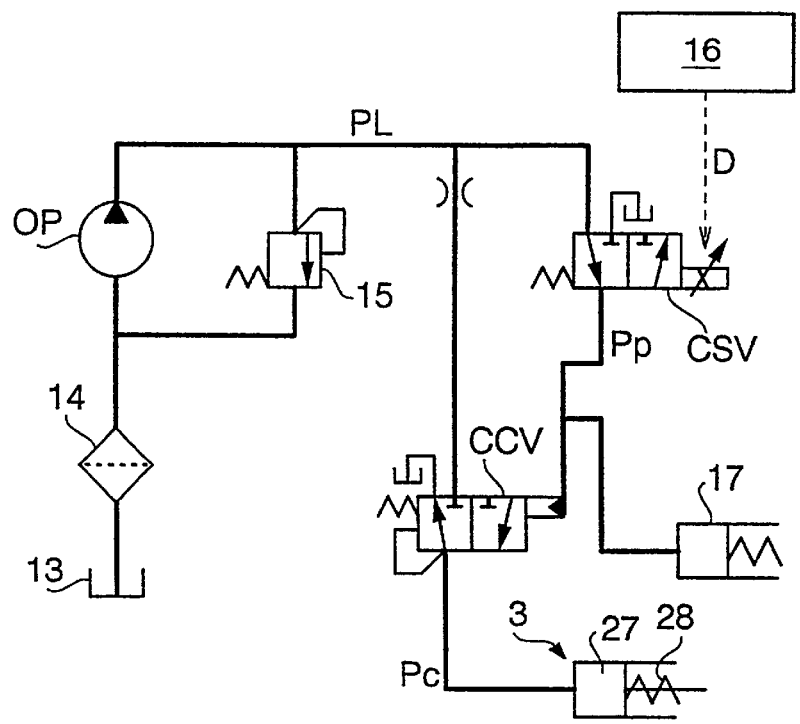
FIG. 2 is a hydraulic circuit diagram illustrating a hydraulic pressure supply device according to an embodiment of the present invention.

The wet-type multiple disc clutch 3 is of a typical constitution. That is, although not shown in the drawing, a plurality of clutch plates are each meshed alternately on the input side and output side inside a clutch casing filled with oil. These clutch plates are pressed together or released by a clutch piston, thereby performing clutch engagement and disengagement. Referring to FIG. 2, the clutch piston 27 is always urged toward the disengagement side by a clutch spring 28, and when hydraulic pressure that is greater than the urging force of the clutch spring 28 is applied to the clutch piston 27, the clutch 3 is engaged. The clutch engagement force and the torque capacity of the clutch increase in accordance with the hydraulic pressure that is applied.

A hydraulic pressure supply device for supplying hydraulic pressure to the wet-type multiple plate clutch 3 will now be explained. As is illustrated in FIG. 2, the oil in an oil tank 13 is aspirated and discharged by a hydraulic pump OP via a filter 14, and the resultant discharge pressure is adjusted by a relief valve 15 such that a constant line pressure PL is created. The oil at this line pressure PL is fed to the clutch 3 under pressure control (reduced pressure), and two valves—a clutch control valve CCV and a clutch solenoid valve CSV—are used for this. In other words, a pilot operation-type hydraulic pressure control system is employed in which the clutch control valve CCV which is connected to the main hydraulic pressure line is caused to open and close in accordance with pilot hydraulic pressure Pp sent from the clutch solenoid valve CSV. The magnitude of the pilot hydraulic pressure Pp is varied in accordance with duty pulse signals outputted from an electronic control unit (ECU) 16.

The clutch solenoid valve CSV is an electromagnetic valve having an electromagnetic solenoid to which the line pressure PL is constantly supplied. The electromagnetic valve receives a duty pulse signal outputted from the ECU 16, and the valve body opens and closes in accordance with the on/off of the pulse. Thereby, the clutch solenoid valve CSV outputs pilot hydraulic pressure Pp which corresponds to the duty (duty ratio) of the duty pulse signal.

The clutch control valve CCV is a spool valve which is opened and closed continuously on the basis of the pilot hydraulic pressure Pp, and is therefore not subject to electronic control. That is, an in-built spool is caused to stroke to the release side in accordance with the magnitude of the pilot hydraulic pressure Pp, whereby the line pressure PL is appropriately adjusted and fed to the clutch 3 as clutch pressure Pc. As a result, the hydraulic pressure supplied to the clutch 3 is therefore duty controlled by the ECU 16.

Note that an accumulator 17 is provided at a point on the path which connects the clutch solenoid valve CSV and the clutch control valve CCV.

Figure 3:
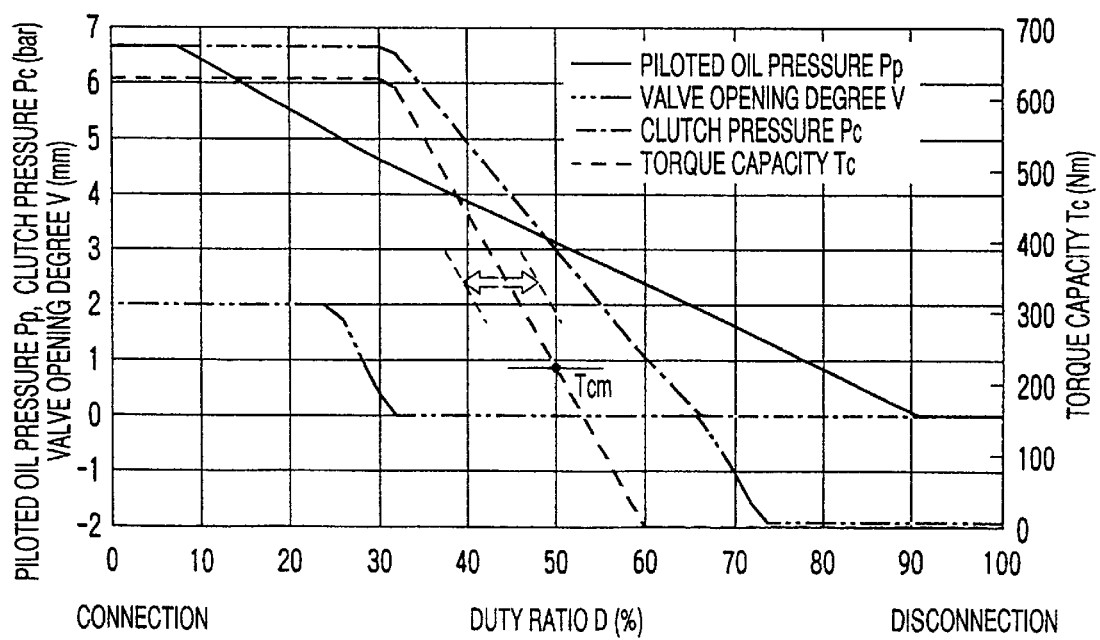
FIG. 3 is a line diagram of the characteristic of a hydraulic pressure supply device according to an embodiment of the present invention.

FIG. 3 is a line diagram of the characteristic of a hydraulic pressure supply device. The axis of abscissa is the duty D of duty pulse signals outputted from the ECU 16, or more specifically is the on duty indicating the proportion of solenoid on time in a predetermined control period (which in this embodiment is 20 msec). In this embodiment, the clutch is set so as to be fully engaged when the duty D is 0%. This is so that the vehicle can be supported while running with the clutch in a state of engagement even when no electric current is being supplied to the clutch solenoid valve CSV (in a so-called off stack state) due to a breakdown or the like of the electric system.

As is illustrated in the drawing, the larger D is, the closer it is to disengagement, and the smaller D is, the closer it is to engagement. As the value of D becomes smaller, the value of the pilot hydraulic pressure Pp outputted from the clutch control valve CCV increases proportionately, and the hydraulic pressure which is supplied to the clutch, or in other words the clutch pressure Pc, and the torque capacity Tc of the clutch 3 tend also to increase proportionately. The valve opening V of the clutch control valve CCV has three positions in the drawing, and in actual fact, at the intermediate opening (valve opening 0 mm) other than being fully opened and fully closed, the spool valve makes a minute stroke and the clutch pressure Pc can be continuously altered.

A control system for the lock-up clutch 7 also exists in this embodiment, but an explanation thereof is omitted here since this bears no relation to the present invention. The constitution of the hydraulic pressure control system thereof is substantially the same as the hydraulic pressure control system of the wet-type multiple plate clutch 3.

Figure 4:
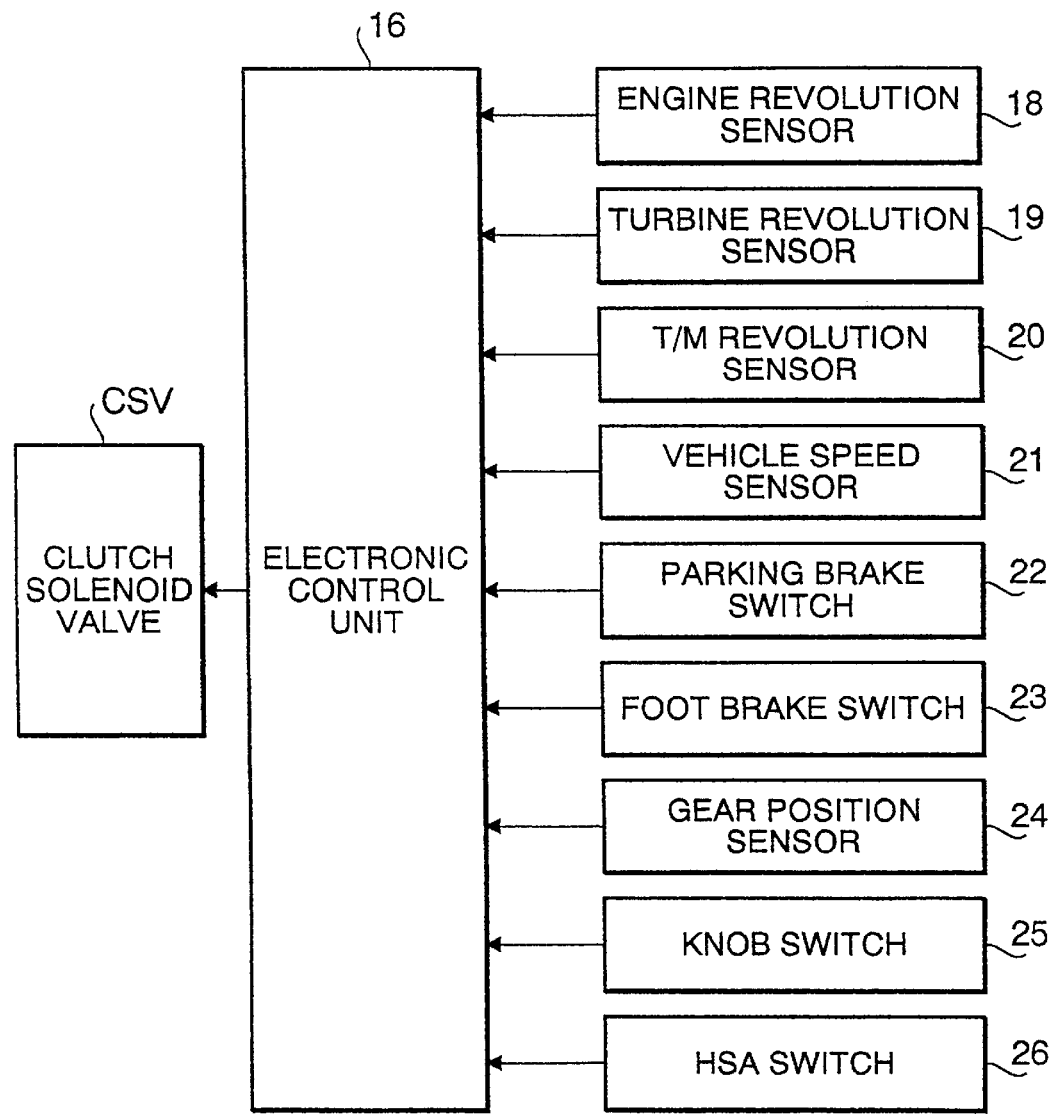
FIG. 4 is a block diagram illustrating an electronic control device according to an embodiment of the present invention.

Next, an electronic control device for electronically controlling a power transmission device will be explained using FIG. 4. Various switches and sensors are connected to the aforementioned ECU 16 as well as the clutch solenoid valve CSV in order to electronically control this device. These include an engine rotation sensor 18 for detecting the engine rotation speed, a turbine rotation sensor 19 for detecting the rotation speed on the input side of the clutch 3, or in other words the rotation speed of the turbine 5, a transmission rotation sensor 20 for detecting the rotation speed of the transmission T/M, or more particularly the rotation speed of the input counter gear 12, and a vehicle speed sensor 21 for detecting the vehicle speed. These sensors are also illustrated in FIG. 1. A parking brake switch 22 for detecting whether the parking brake is in operation or not, a foot brake switch 23 for determining whether the foot brake is in operation or not, and a gear position sensor 24 for detecting the gear position of the transmission are also provided.

A knob switch 25 is also connected to the ECU 16. More specifically, in order to detect the start time of a gear change operation by a driver, or in order to determine the start timing for clutch disengagement, a shift knob is attached to the shift lever in the driver's cab so as to be slightly movable in the shift direction, and the knob switch 25 is provided between the lever and the shift knob. When the shift knob oscillates prior to a lever operation during a gear change operation by the driver, the knob switch 25 turns on, in response to which clutch disengagement begins. The specific constitution of this device is similar to that disclosed in Japanese Patent Application Laid-Open No. H11-236931.

A hill start aid (HSA) device which is disclosed in the same patent application is also provided in the power transmission device of this embodiment, and an HSA switch 26 for performing a manual on/off operation of this device is also provided in the driver's cab. The HSA switch 26 is connected to the ECU 16. This HSA switch 26 doubles as a trigger switch used at the beginning of torque learning (to be described hereinafter), and thus the HSA itself is of little meaning here.

The operation of the power transmission device according to this embodiment will now be explained.

In this power transmission device, the power of the engine E is transmitted to the fluid coupling 2, the wet-type multiple plate clutch 3, and the transmission T/M sequentially. As a rule, the lock-up clutch 7 is always on (engaged) when the vehicle is running following start-up, and off (disengaged) only when the vehicle is stationary. Thus, during vehicle start-up, the creep of the fluid coupling 2 can be used in a similar fashion to a typical AT automobile, whereby control becomes easier than performing start-up control of a friction clutch electronically, and loss due to slippage can be prevented due to the fact that the fluid coupling 2 is locked while the vehicle is running. The wet-type multiple plate clutch 3 is disengaged and engaged each time a gear change is performed. This is similar to a typical MT automobile.

First the operation during a garage shift upon vehicle start-up will be explained. It is assumed that the vehicle is stationary due to a braking operation or the gear being in neutral, and that the driver is about to operate the shift lever to the start-up level in order to advance. When this occurs, the shift knob oscillates prior to the lever operation of the shift lever, whereby the knob switch 25 is switched on. In response thereto, the clutch 3 is disengaged. When the shift lever is subsequently operated, the transmission T/M is put into the start-up level gear, and when this is detected by the gear position sensor 24, the clutch 3 is engaged. The foot brake or parking brake is operated by the driver prior to the shift lever operation, and therefore the turbine 5 is halted from the driving wheel side by the clutch engagement. As a result thereof, the pump 4 slides relative to the turbine 5 and creep force is generated. Thereafter, the brake need only be released or the accelerator stepped upon for the vehicle to start moving.

Next, an operation to change gear while the vehicle is in motion will be explained. It is assumed that the vehicle is running in a predetermined gear and the driver is about to operate the shift lever to the next gear level in order to change speed. When this occurs, the shift knob oscillates prior to the lever operation whereby the knob switch 25 is switched on. In response thereto, the clutch 3 is disengaged. When the shift lever is subsequently operated, the transmission T/M is put into the next gear level, and when this is detected by the gear position sensor 24, the clutch 3 is engaged. Gear change is thus completed. During this gear change the lock-up clutch 7 remains on and the engine power continues to be transmitted to the clutch 3.

Next, the content of clutch engagement control will be explained using FIGS. 5 and 6. This control is basically open control excluding the slow engagement control and the movement therefrom to full engagement control to be described hereinafter.

Figure 5:
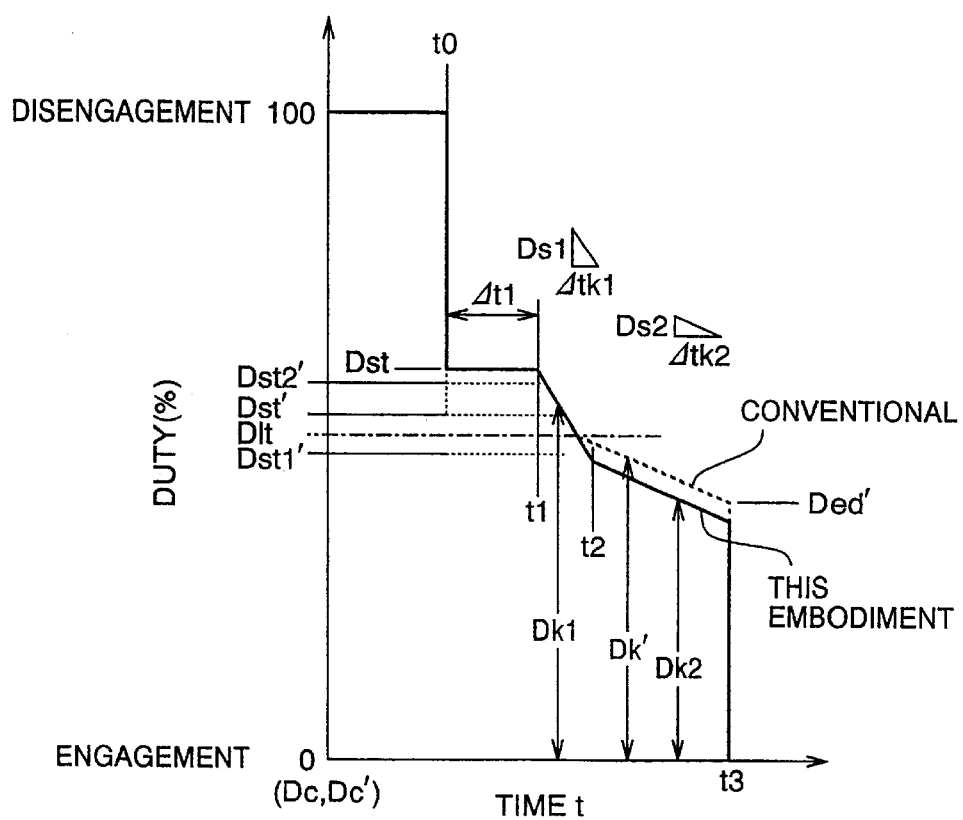
FIG. 5 is a time chart illustrating the content of the clutch control according to an embodiment of the present invention.

In FIG. 5, the axis of abscissa is time t, and the axis of ordinate is the duty D outputted from the ECU 16. Control is performed at intervals of predetermined control periods of $\Delta t=20$ msec. It is assumed here that a garage shift is performed upon vehicle start-up, that is, the driver performs a shift operation from neutral to the start-up level while the vehicle is in an idling stationary state due to a braking operation, whereupon the clutch is engaged and creep is generated. "Stationary" does not only indicate that the vehicle speed is zero, but may also include vehicle speeds extremely close to zero. In this embodiment, stationary indicates a vehicle speed of 3 km/h or less. In FIG. 6, the axis of abscissa is time t, and the axis of ordinate is rotation speed. The engine rotation speed Ne is illustrated by an unbroken line, and the turbine rotation speed Nt is illustrated by a dot/dash line. The engine rotation speed Ne is constant at idling rotation speed=600 rpm, and since initially the gear is neutral and the clutch is fully disengaged, the pump and turbine of the fluid coupling rotate in unison and the turbine rotation speed Nt and engine rotation speed Ne are equal.

As is illustrated in FIG. 5, it is assumed that the gear engaging operation was completed at time t0 and that a gear-in signal has been transmitted from the gear position sensor 24 to the ECU 16. Thereafter, from a state of full disengagement (D=100(%)), a one-shot engagement duty, or in other words the starting duty Dst (starting duty pulse signal) is initially outputted from the ECU 16, whereupon one-shot engagement control is executed. The starting duty Dst is preset such that the clutch is largely engaged up to the vicinity of the torque point, and such that excessive clutch engagement shock is never produced by taking into consideration irregularities in the torque point. In the example in FIG. 5, the starting duty Dst is experientially or experimentally determined such that, even if an optimum starting duty value slips to the furthest disengagement side, as does Dst2', due to outside disturbances such as individual differences among clutches or the like, the driving conditions, and variation with time, the starting duty Dst will become this slipped value or a higher value. Note that the starting duty Dst is a value in the range from being close to the torque point learning value Dlt to being as close as possible thereto. In this embodiment, Dst=60%. Thus in this embodiment, one-shot engagement is executed up to a position which is further removed from the torque point than the conventional starting duty Dst'.

The torque point learning value Dlt will now be explained. A wet-type multiple plate clutch differs from a dry friction clutch in that there is no such concept as a clutch stroke. Therefore, the torque point cannot be determined by detecting the clutch stroke. Consequently, the torque point learning value is determined using the values of the duties of the duty pulse signals which the ECU 16 itself outputs. As for the learning method, first, when the vehicle is stationary and in gear following a brake operation, and the clutch is fully disengaged, one-shot engagement is always executed to a position in which the torque point is not reached, whereupon slow clutch engagement is performed slowly by means of a regular slow engagement method. Then, when the difference between the engine rotation speed and turbine rotation speed equals or exceeds a predetermined value, the value of the duty at this time is relearned as the torque point learning value. As is illustrated in FIG. 6, the turbine rotation speed Nt gradually falls below the engine rotation speed Ne due to slow clutch engagement, and therefore, when the rotation difference at this time reaches or exceeds the predetermined value Nm, this position is set as the torque point of the clutch and the value of the duty which is being outputted at this time is stored as the torque point learning value Dlt. Here, Nm has been set at 300 rpm.

Referring to FIG. 3, and assuming that the rotation difference $\Delta N$ has reached or exceeded the predetermined value Nm for the first time when D has come to equal 50%, the torque capacity of the clutch 3 at this time is Tcm=approx. 200 (Nm), and this becomes the torque point. Even if the torque capacity slips as in the line drawing due to irregularities in the clutch or the like, the torque capacity and rotation difference $\Delta N$ have a univocal relationship and therefore the point indicating the same torque capacity Tcm can be detected as long as the duty D indicating the same rotation difference $\Delta N$ is detected. Hence a constant torque point can always be detected and learned regardless of individual differences among clutches.

Returning to FIG. 5, after the output of the starting duty Dst, the starting duty Dst is held for a fixed amount of time $\Delta t1$ (which is 200 msec in this embodiment), and following the elapse of this amount of time $\Delta t1$, the process moves to slow engagement control. The reason for awaiting the elapse of this fixed amount of time $\Delta t1$ is that there is a delay in response during which a state of engagement commensurate with the starting duty Dst cannot be immediately obtained even if the starting duty Dst is outputted. This is due to the fact that the clutch plates only begin to be pressed together after the initial stroke (up to 2 mm), which corresponds to the bite region of the clutch piston, has ended. By waiting for the elapse of this amount of time $\Delta t1$, the response delay is absorbed and the proceeding slow engagement control may be performed according to plan.

Slow engagement control begins with the output of first slow engagement duties Dk1 (first slow engagement duty pulse signals) from time t1. The first slow engagement duties Dk1 are such that the clutch is slowly engaged at a comparatively fast speed, and are obtained by deducting a first step duty Ds1 from the value of the previous duty. In other words, the first step duty Ds1 is set at a comparatively large value, which in this case is 0.4%. Thus in this case, first slow engagement is performed at a faster rate than conventional slow engagement by reducing the duty by one step duty Ds1 at a time. Note that the period of reduction $\Delta tk1$ of the slow engagement duties Dk1 is set to be equal to one control period $\Delta t$ in this embodiment, but may, for example, be set to be equal to a plurality of control periods $n\Delta t$. It goes without saying that the clutch is engaged more slowly during this first slow engagement control than during the one-shot engagement control.

Figure 6:
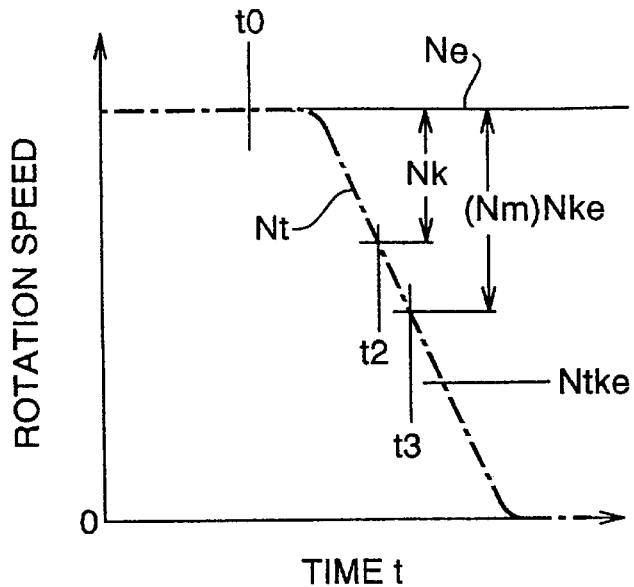
FIG. 6 is a time chart illustrating the states of variation in engine rotation speed and turbine rotation speed during clutch engagement.

When fast slow engagement is performed in this manner, as is illustrated in FIG. 6, clutch engagement begins before long, whereupon the turbine rotation speed Nt falls below the engine rotation speed Ne. When the amount of this fall and the rotation difference reach or exceed a predetermined value Nk at the time point t2, slow engagement is switched to a lower speed. In this embodiment, this speed is Nk=200 rpm.

As is illustrated in FIG. 5, the output of second slow engagement duties Dk2 (second slow engagement duty pulse signals) begins from time t2. The second slow engagement duties Dk2 are such that the clutch is slowly engaged at a comparatively slow speed, and these duties are of course obtained by deducting a second step duty Ds2 from the value of the previous duty. The second step duty Ds2 is set at a comparatively small value, which in this case is 0.02%. Thus in this case, second slow engagement is performed at the same rate as conventional slow engagement by reducing the duty by one step duty Ds2 at a time. The period of reduction $\Delta tk2$ of the second slow engagement duties Dk2 is also set to be equal to one control period $\Delta t$, but may also be set to be equal to a plurality of control periods $n\Delta t$.

As is illustrated in FIG. 6, the turbine rotation speed Nt falls further below the engine rotation speed Ne due to such slow slow engagement. Then, at the point when Nke (which is 300 rpm in this embodiment) is reached or exceeded by the rotation difference $\Delta N=Ne-Nt$ (time t3), the process moves to full engagement control. In full engagement control, a duty corresponding to full clutch engagement, or in other words a full engagement duty Dc=0% (full engagement duty pule signal) is outputted, and the clutch is fully engaged in one stroke. As a result, as is shown in FIG. 6, the turbine rotation speed Nt falls to zero and creep is produced at vehicle start-up standby.

Thus, full clutch engagement control is moved to during slow clutch engagement control at the point when the difference in rotation $\Delta N$ between the input side rotation speed of the fluid coupling 2 (that is, the engine rotation speed Ne) and the output side rotation speed (that is, the turbine rotation speed Nt) reaches or exceeds the predetermined value Nke, whereupon the duty Dc=0% corresponding to full clutch engagement is outputted, and thus the region at the point of half clutch completion in which clutch transmission torque is unstable can be engaged in one stroke such that smooth clutch engagement can be realized. Furthermore, speed shift shock during a garage shift can be prevented. Even in cases where the half clutch state and the times t1 to t3 of slow engagement control are protracted, hunting in the turbine rotation can be prevented and unusual vehicle behavior (such as shock) and rattling sounds can be prevented.

In conventional control, full engagement control is moved to when a fixed slow engagement completion duty Ded' is reached. In so doing, however, optimum movement to full engagement cannot be performed when variations or irregularities in the clutch characteristic occur due to outside disturbances such as individual differences among clutches and so on, the driving conditions, and variation with time. According to the control of the present invention, the timing of movement to full engagement is determined on the basis of the rotation difference between the input and output sides of the fluid coupling 2 in which variations and irregularities in the actual clutch characteristic are reflected. As a result, redundancy is maintained and clutch engagement at the point of half clutch completion is always performed with a sense of stability.

In this case, the threshold value Nke of the aforementioned rotation difference is an experimental value which is set to a value at which the clutch sufficiently transmits torque and at which clutch engagement shock is not produced even when full engagement control is moved to. Conversely, when the rotation difference $\Delta N$ between the input and output sides of the fluid coupling 2 reaches such a value Nke, the clutch has already transmitted enough power to produce creep, and thus, even if the clutch is mistakenly engaged in one stroke at this point, clutch engagement shock is not produced, and on the contrary, the region in which torque transmission is unstable can be passed by in one stroke.

The control of the present invention has the following features. In reality, irregularities in the torque and slippages and irregularities in the value of the optimum starting duty, such as in Dst1' and Dst2' in FIG. 5, may occur due to outside disturbances such as individual differences among clutches and the like, the driving conditions, and variation with time. Moreover, these slippages and irregularities cannot be detected prior to relearning of the torque point. Thus, when the value of the starting duty is controlled only to Dst', engagement time lag increases when Dst' slips to Dst1', and engagement shock increases when Dst' slips to Dst2'.

According to the control of the present invention, the starting duty Dst is determined as described above, and thus no excessive clutch engagement shock due to the one-shot engagement is produced even when the optimum starting duty slips to the furthest value on the disengagement side (for example Dst2') due to outside disturbances such as individual differences. Fast slow engagement is performed thereafter, and thus even when one-shot engagement ends at a position which is slightly farther from the torque point than conventionally, the conventional level can be reached directly so that time lag can be prevented. In this case, no engagement shock is produced by such fast slow engagement either. The reason for this is that such fast slow engagement is only performed up to the stage of initial engagement. When the difference Nk between the engine rotation speed Ne and the turbine rotation speed Nt is within the range of Nk=200 rpm, shock does not occur at a level which is perceivable by a driver even though engagement is slightly fast. Accordingly there are no problems concerning engagement shock. When this fast slow engagement is complete, conventional slow slow engagement is performed, and thus the clutch can be engaged smoothly while preventing engagement shock. According to such control, redundancy can be maintained and both time lag and shock during clutch engagement can be prevented even when slippages or irregularities due to outside disturbances occur in the optimum starting duty value. In particular, garage shock and time lag can be effectively prevented during vehicle start-up, and thus the vehicle can advance smoothly.

Figure 7:
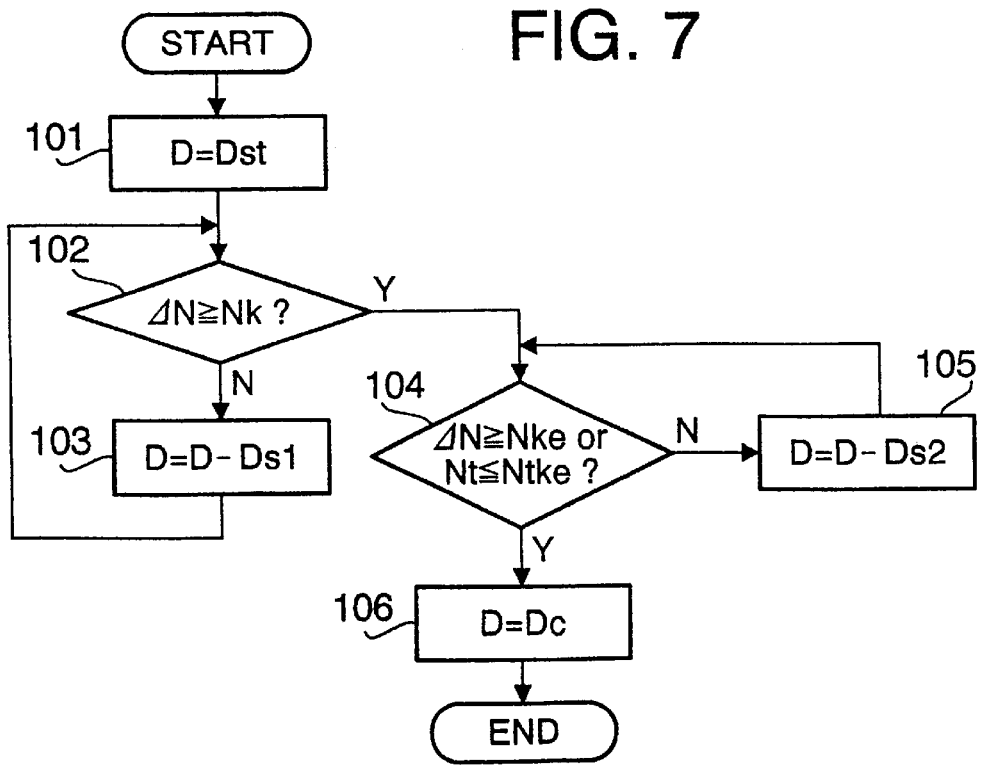
FIG. 7 is a flowchart illustrating the content of the clutch control according to an embodiment of the present invention.

The content of the clutch control according to the present invention will now be explained using the flowchart shown in FIG. 7.

This flowchart begins with the input of a gear-in signal to the ECU 16. First, in step 101, a duty D outputted from the ECU 16 is set as the starting duty Dst=60%. Then, the elapse of a fixed amount of time Δt1 is awaited, although this step has been omitted from the flowchart. Next, in step 102, a judgement is made as to whether the difference ΔN (=Ne−Nt) between the engine rotation speed Ne and the turbine rotation speed Nt has reached or exceeded a predetermined value Nk=200 rpm or not. Initially this stage has not been reached, and therefore step 103 is proceeded to, where the duty D which is outputted this time is set at a value (D−Ds1) of a first step duty Ds1=0.4% minus the previous value. By this process, ΔN≧Nk is eventually reached in step 102. Then the process proceeds to step 104, where a judgment is made as to whether the rotation difference ΔN has reached or exceeded Nke=300 rpm or not, or whether the turbine rotation speed Nt has reached or fallen below Ntke=200 rpm or not. In other words, in this case full engagement is executed not only when the condition of ΔN≧Nke has been fulfilled, but when the condition Nt≦Ntke has also been fulfilled. This is because when, for example, the engine rotation speed becomes lower than normal idling rotation speed, the turbine rotation speed Nt sometimes reaches or falls below Ntke before the rotation difference ΔN reaches or exceeds Nke. Initially neither condition is satisfied, and hence step 105 is proceeded to, where the duty D outputted this time is set as a value (D−Ds2) of a second step duty Ds2=0.02% minus the previous value. By this process ΔN≧Nke or Nt≦Ntke is reached in step 104. Then the process proceeds to step 106, where the outputted duty D is set as the full engagement duty Dc=0% and the flowchart ends.

Note that this embodiment of the present invention is not limited to the above descriptions. The wet-type friction clutch of the present invention is of a multiple plate type in this embodiment, but may, for example, be of a single plate type. The fluid pressure in the present invention is hydraulic pressure in this embodiment, but may be another type of fluid pressure such as pneumatic pressure, for example. The transmission in the present invention is a constant mesh manual transmission in this embodiment but may, for example, be a constant mesh automatic transmission or a planetary gear automatic transmission such as that in an AT automobile. The engine may be diesel, gasoline, or any other type. All of the aforementioned numerical values may be modified appropriately. The clutch need not necessarily be engaged from a fully disengaged state, and the present invention may be applied to such a case.

Further, the method of shifting from slow engagement control to full engagement control as described above is not limited to a vehicle power transmission device, but may be applied to any power transmission device in which a fluid coupling and a friction-type clutch capable of performing engagement/disengagement control are provided in series. In such a case, the friction-type clutch of the present invention, which is a wet-type multiple plate clutch in this embodiment, may be a single plate type or a dry type, for example.

According to the present invention as described above, excellent effects can be achieved upon vehicle start-up such as the stabilization of clutch transmission torque at the point of half clutch completion during a garage shift, which leads to smooth clutch engagement.

What is claimed is:

1. A vehicle power transmission device in which a fluid coupling and a wet friction clutch are provided in series at points on a power transmission path which extends from an engine to a transmission, and which performs engagement/disengagement control of the clutch by varying the pressure of operating fluid used for engagement/disengagement driving the clutch in accordance with duty pulse signals outputted from an electronic control unit, wherein, when a vehicle starts up from a standstill, clutch engagement control is begun at the same time as the transmission is put into gear during a braking operation and a state of clutch disengagement, a duty pulse signal corresponding to full clutch engagement being outputted from the electronic control unit when the rotation difference on the input and output sides of the fluid coupling reaches or exceeds a predetermined value during this engagement control.

2. The vehicle power transmission device according to claim 1, wherein said clutch engagement control is such that, initially, is executed one-shot engagement control in which a starting duty pulse signal, which is predetermined such that the clutch is largely engaged up to the vicinity of the torque point and excessive clutch engagement shock is never produced by taking into consideration irregularities in the torque point, is outputted from the electronic control unit, whereupon the process moves to slow engagement control, and wherein this slow engagement control is such that first slow engagement duty pulse signals are outputted from the electronic control unit at predetermined time intervals such that the clutch is engaged more slowly than in said one-shot engagement control, whereupon second slow engagement duty pulse signals are outputted from the electronic control unit at predetermined time intervals once predetermined conditions have been fulfilled such that the clutch is engaged more slowly than in said first slow engagement.

3. A clutch control method for performing engagement/disengagement control of a clutch in accordance with duty pulse signals outputted from an electronic control unit, this method being used in a vehicle power transmission device in which a fluid coupling and a wet friction clutch are provided in series at points on a power transmission path which extends from an engine to a transmission, wherein, when a vehicle starts up from a standstill, clutch engagement control is begun at the same time as the transmission is put into gear during a braking operation and a state of clutch disengagement, a duty pulse signal corresponding to full clutch engagement being outputted from the electronic control unit when the rotation difference on the input and output sides of the fluid coupling reaches or exceeds a predetermined value during this engagement control.

4. A power transmission device in which a fluid coupling and a friction-type clutch capable of performing engagement/disengagement control are provided in series at points on a power transmission path, wherein the clutch engagement control is executed when the output side of the clutch has been damped, and full engagement control of the clutch is switched to during the process of clutch engagement control when the rotation difference between the input and output sides of the fluid coupling reach or exceed a predetermined value.

* * * * *